United States Patent [19]

Oz

[11] Patent Number: 5,509,692
[45] Date of Patent: Apr. 23, 1996

[54] MONETARY INSTRUMENT

[75] Inventor: Giora Oz, Kubbutz Be'eri, Israel

[73] Assignee: Be'Eri Printers, Kibbutz Be'eri, Israel

[21] Appl. No.: 183,059

[22] Filed: Jan. 18, 1994

[30] Foreign Application Priority Data

Jan. 26, 1993 [IL] Israel ......................... 104520

[51] Int. Cl.$^6$ ................................. B42D 15/00
[52] U.S. Cl. .................... 283/70; 283/58; 340/825.34; 380/25
[58] Field of Search ................... 283/57, 58, 59, 283/67, 70, 72; 380/23, 25, 26; 340/825.34

[56] References Cited

U.S. PATENT DOCUMENTS

| | | | |
|---|---|---|---|
| 3,363,917 | 1/1968 | Gunderson et al. | 283/58 |
| 3,829,133 | 8/1974 | Smagala-Romanoff | 283/58 |
| 4,231,593 | 11/1980 | Bell, Jr. et al. | 283/58 |
| 4,588,211 | 5/1986 | Greene | 283/70 |
| 4,630,844 | 12/1986 | Troy et al. | 283/67 |
| 4,675,669 | 6/1987 | Goldman | 340/825.34 |
| 4,681,348 | 7/1987 | Mowery, Jr. | 283/58 |
| 4,865,351 | 9/1989 | Smithson | 283/58 |
| 4,972,476 | 11/1990 | Nathans | 380/23 |
| 5,016,919 | 5/1991 | Rotondo | 283/58 |
| 5,033,773 | 7/1991 | Brunea et al. | 283/95 |
| 5,044,668 | 9/1991 | Wright | 283/58 |
| 5,121,945 | 6/1992 | Thomson et al. | 283/58 |
| 5,326,136 | 7/1994 | Doyle | 283/58 |
| 5,354,097 | 10/1994 | Tel | 283/72 |

*Primary Examiner*—Hwei-Siu Payer
*Attorney, Agent, or Firm*—Abelman, Frayne & Schwab

[57] ABSTRACT

A monetary instrument bearing a machine-only readable indication of information relating thereto.

21 Claims, 3 Drawing Sheets

MONETARY INSTRUMENT

FIELD OF THE INVENTION

The present invention relates to monetary instruments generally and to banking methods employing monetary instruments.

BACKGROUND OF THE INVENTION

There are known a wide variety of monetary instruments and banking methods utilizing them. Summarized below are a few examples found in the patent literature:

U.S. Pat. No. 5,044,668 describes a check checker system which employs a check carrying a magnetic strip or bar code containing information permitting point of sale credit approval.

U.S. Pat. No. 5,033,773 describes a document system having improved image security and incorporating a detectable substance which is released from microcapsules in image areas.

U.S. Pat. No. 4,865,351 describes a photo check in which a photograph of a person is disposed upon a check to make quick identification of the person authorized to sign the check.

U.S. Pat. No. 4,681,348 describes a financial document wherein the area in which numerals representing a sum of money to be paid is overprinted in its entirety. U.S. Pat. No. 4,588,211 describes a machine readable document which bears unknown variable data of a specified nature imprinted thereon in unknown, variable locations.

U.S. Pat. No. 3,829,133 describes a form of check incorporating a masked individual code for each check predictable before unmasking only by the authorized drawer of the check, who has advance knowledge of the key by which the individual code for the check is determined.

SUMMARY OF THE INVENTION

The present invention seeks to provide a monetary instrument, such as a check, which provides a machine-only readable indication of verification information.

There is thus provided in accordance with a preferred embodiment of the present invention a monetary instrument bearing a machine-only readable indication of information relating thereto.

The information may include, in the case of a check, a representation of the authorized signature, the check number, the account number, the branch number, and an identification number of the authorized signatory.

The information may be encrypted, so as to prevent unauthorized persons from reading it or writing it, or unencrypted.

There is also provided in accordance with a preferred embodiment of the present invention a method for point of presentation verification of information relating to monetary instruments including the steps of machine reading a machine-only readable representation of the information, comparing human recognizable information printed on a monetary instrument with a representation thereof provided by machine reading of the machine-only readable representation, and in response to similarity, providing an output indication of human recognizable printed information verification.

The information may include, for example, an instrument number, an account number, a bank number, and an identification number.

In accordance with one embodiment of the present invention, the comparing step is provided by a human operator. Alternatively, the comparing step may be carried out by machine.

There is also provided in accordance with a preferred embodiment of the present invention a method for point of presentation signature verification for checks including the steps of machine reading a machine-only readable representation of an authorized signature on a check, comparing the actual signature on the check with the representation thereof provided by machine reading of the machine-only readable representation; and in response to similarity, providing an output indication of signature verification.

In accordance with one embodiment of the present invention, the comparing step is provided by a human operator. Alternatively, the comparing step may be carried out by machine.

Additionally in accordance with a preferred embodiment of the present invention there is provided a system for verification of monetary instruments bearing machine-only readable information thereon including a reader for reading the machine-only readable information, a computer for receiving the output of the reader and for providing an output of information represented by the machine-only readable information and a display for displaying in human recognizable form, the information represented by the machine-only readable information.

In addition, the system may also include a reader for reading human-recognizable information from a monetary instrument, and means for automatically comparing an output of such reader of said information with the output of information represented by the machine-only readable information.

In accordance with a preferred embodiment of the invention, a single reading device may include the functions of both readers.

Preferably, the display is operative for displaying the output of the reader of the human recognizable information from a monetary instrument together with the information represented by the machine-only readable information.

There is also provided according to a preferred embodiment of the present invention a system for verification of a monetary instruments bearing a machine-only readable signature thereon comprising a reader for reading the machine-only readable signature, a computer for receiving an output of the reader and for providing an output of information represented by the machine-only readable signature, and a display for displaying in human recognizable form, the information represented by the machine-only readable signature.

The above described system may include in addition a second reader for reading an actual signature affixed to a monetary instrument and means for automatically comparing an output of the reader of the actual signature with the output of information represented by the machine-only readable signature.

The outputs of the first and second readers may be displayed together. Preferably a single reading device is operative to provide the functions of both readers.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
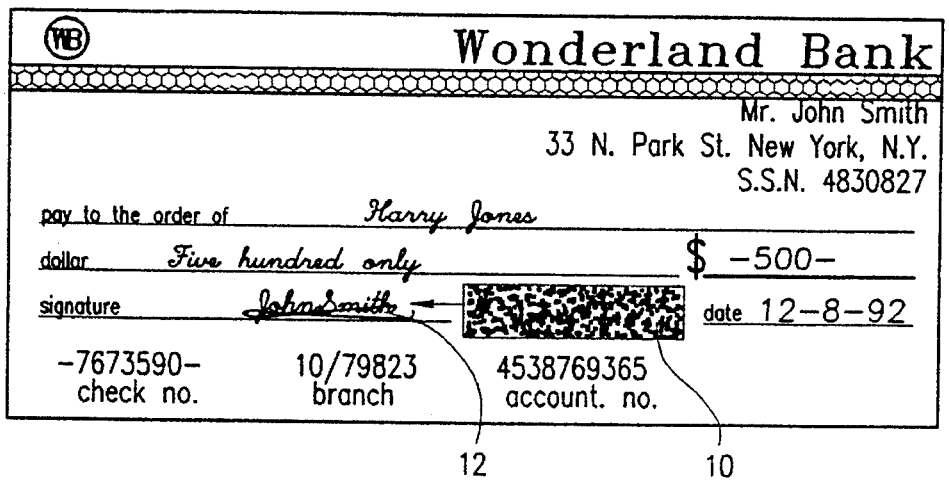
FIGS. 1A, 1B and 1C are illustrations of monetary instruments constructed and operative in accordance with a preferred embodiment of the present invention.
Figure 1B:
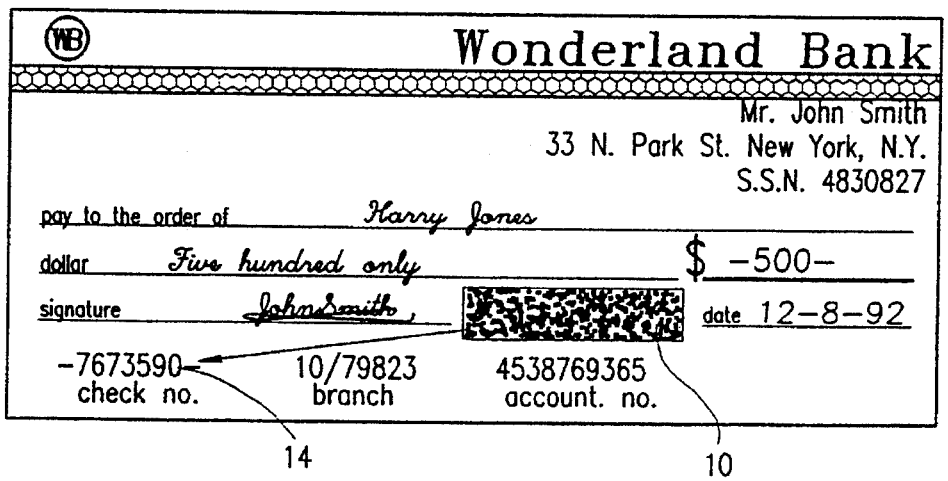
Figure 1C:
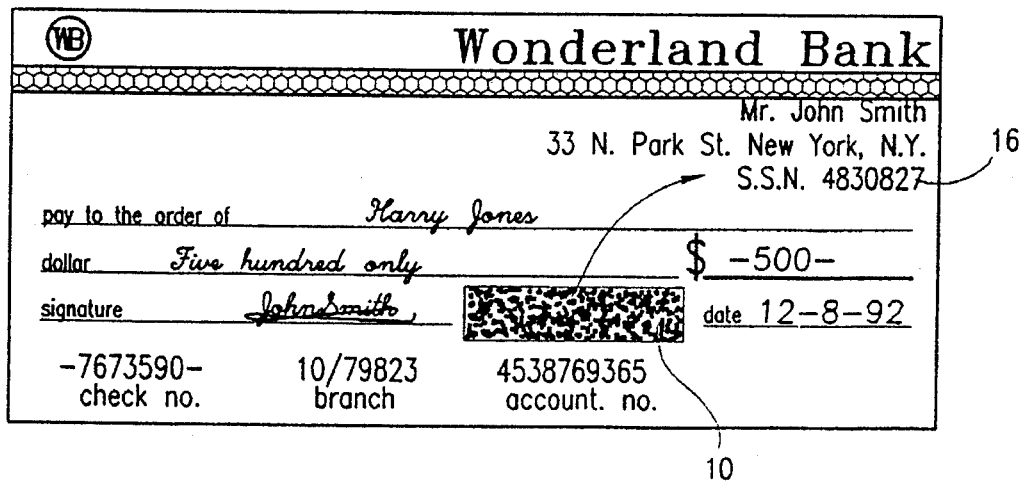

Reference is now made to FIGS. 1A, 1B and 1C, which illustrate three different features of a monetary instrument, such as a check, constructed and operative in accordance with a preferred embodiment of the present invention.

The monetary instrument is characterized in that it includes a machine-only readable portion 10 which contains information which may be used to verify the genuineness of information which appears on the monetary instrument.

Throughout the specification and claims, the phrase "machine-only readable" refers to information which cannot normally be read unaided by humans but which can be read by suitable machinery. Preferably, the machine-only readable information cannot readily be written by unauthorized persons.. Such machine-only readable information can be encrypted by conventional encryption techniques, but need not be.

In accordance with one preferred embodiment of the invention, as illustrated herein, the machine-only readable information may appear on the monetary instrument in optically readable form as a pattern of colored areas which may be sensed by a conventional optical reader and decoded as by the use of a conventional look up table operated by a computer. Alternatively, the information may be magnetically sensible or sensible by any other suitable technique. It is to be appreciated that the invention is not limited by the particular technology employed for writing and reading the machine-only readable information.

FIG. 1A illustrates a particularly preferred feature of the present invention wherein the machine-only readable information 10 on a check contains a reference signature which may be matched with the signature 12 actually appearing on the check. A potential forger is assumed to be unable to read the machine-only readable information 10 and thus is unable to adapt the forged signature thereto.

Additionally or alternatively to the feature illustrated in FIG. 1A, the machine-only readable information 10 may also contain the number of the check, as printed elsewhere on the check and indicated at reference 14 in FIG. 1B. Inasmuch as a counterfeiter of blank checks is assumed to be unable to write the machine-only readable information 10, such counterfeiter is assumed to be unable to provide a match between the printed number 14 and the machine-only readable information 10.

Additionally or alternatively to the features illustrated in FIGS. 1A and 1B, the machine-only readable information 10 may also contain an identification number of the authorized signatory of the check, as printed elsewhere on the check and indicated at reference 16 in FIG. 1C. Inasmuch as a counterfeiter of blank checks is assumed to be unable to write the machine-only readable information 10, such counterfeiter is assumed to be unable to provide a match between the printed number 16 and the machine-only readable information 10.

It is appreciated that a negotiable instrument, such as a credit card voucher, check, traveler's check or the like may include any one or more of the features illustrated in FIGS. 1A–1C.

Figure 2A:
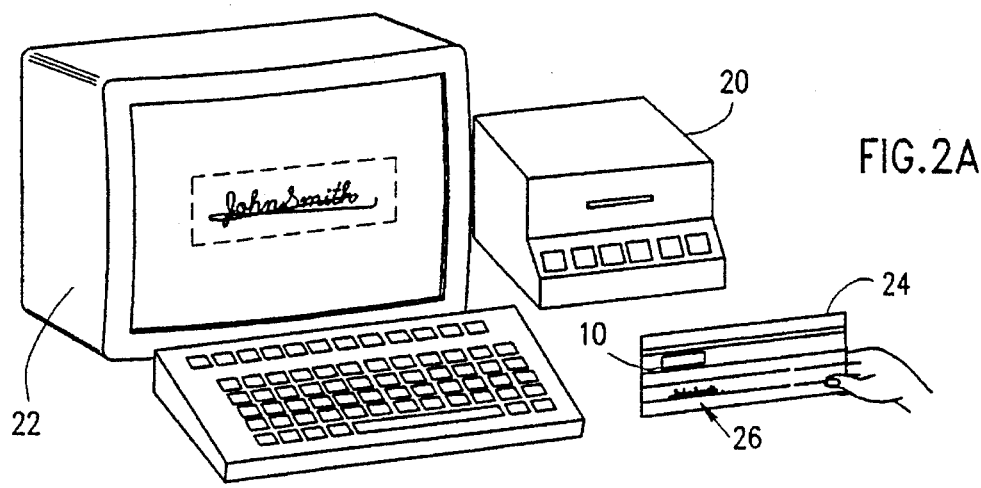
FIGS. 2A, 2B and 2C are illustrations of the operation of a verification system in conjunction with monetary instruments of the types shown in FIGS. 1A, 1B and 1C respectively.
Figure 2B:
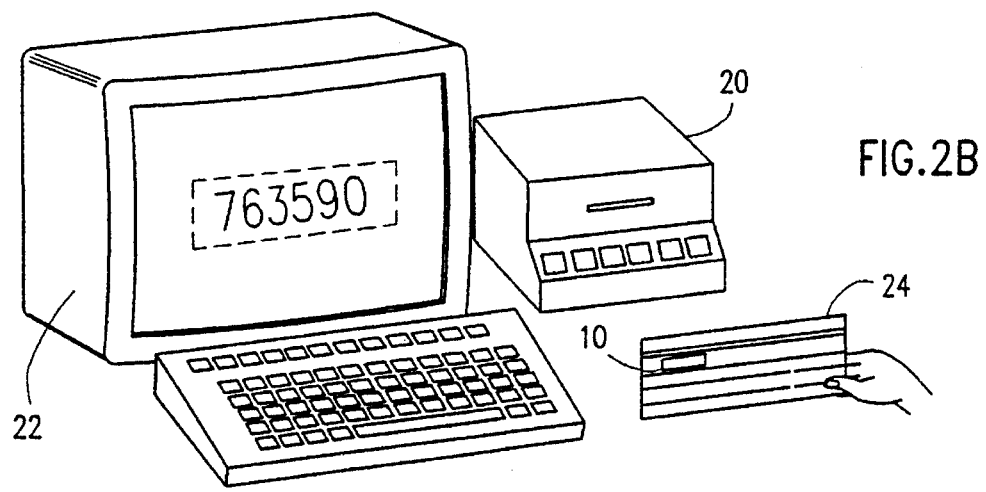
Figure 2C:
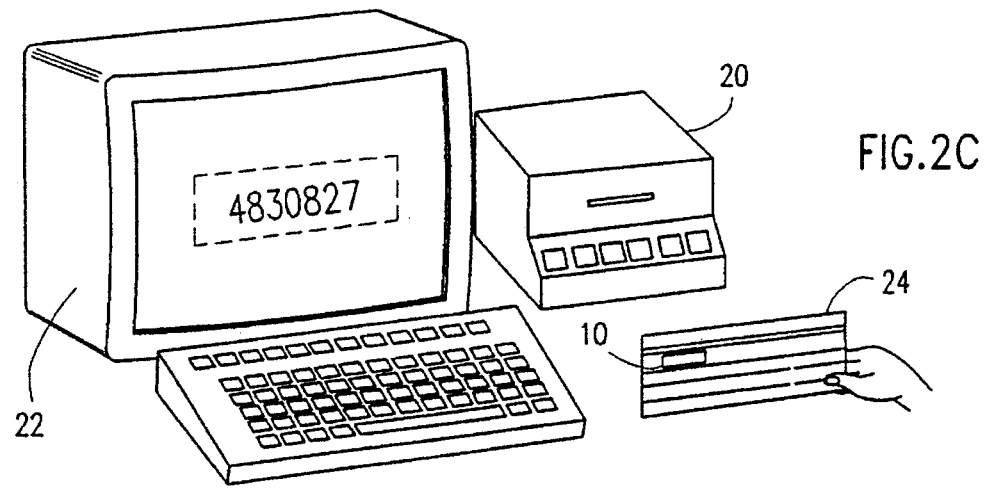

Reference is now made to FIGS. 2A–2C, which illustrate in simplified pictorial form, apparatus and a technique for employing the monetary instruments of FIGS. 1A–1C respectively. FIG. 2A illustrates the use of an optical reader 20 of conventional construction and operation and a computer 22 to read the machine-only readable information 10 on a check 24 and to display it so that the operator can compare the signature on the check with a displayed reference signature 26 which is read from machine-only readable information 10. In such a case, a human operator may readily determine whether a sufficient resemblance exists between the reference signature 26 and the signature on the check.

Alternatively, conventional pattern recognition hardware and software may carry out the comparison in an automated manner.

Alternatively or additionally, the actual signature is displayed with the reference signature 26 on the display of computer 22 such that a human operator can readily compare them.

FIG. 2B illustrates display of the check number using what may be the same apparatus as employed in FIG. 2A. Here automatic comparison of the printed check number with the check number read from the machine-only readable information may be readily accomplished even without pattern recognition apparatus, inasmuch as the printed check number is conventionally read by magnetic readers. In the case of automated comparison, no visual display of the signature or the check number need be provided.

Alternatively or additionally, the printed check number is displayed with the check number read from the machine-only readable information on the display of computer 22 such that a human operator can readily compare them.

FIG. 2C illustrates display of an identification number of the authorized signatory of a check using what may be the same apparatus as employed in FIG. 2A. Here automatic comparison of the printed identification number with the identification number read from the machine-only readable information may be readily accomplished even without pattern recognition apparatus, inasmuch as the printed identification number may be read by conventional magnetic or other readers. In this case, a visual display may nevertheless be useful particularly when additional identification evidence may be requested of a person presenting the check.

Alternatively or additionally, the printed identification number is displayed with the identification number read from the machine-only readable information on the display of computer 22 such that a human operator can readily compare them.

Figure 3:
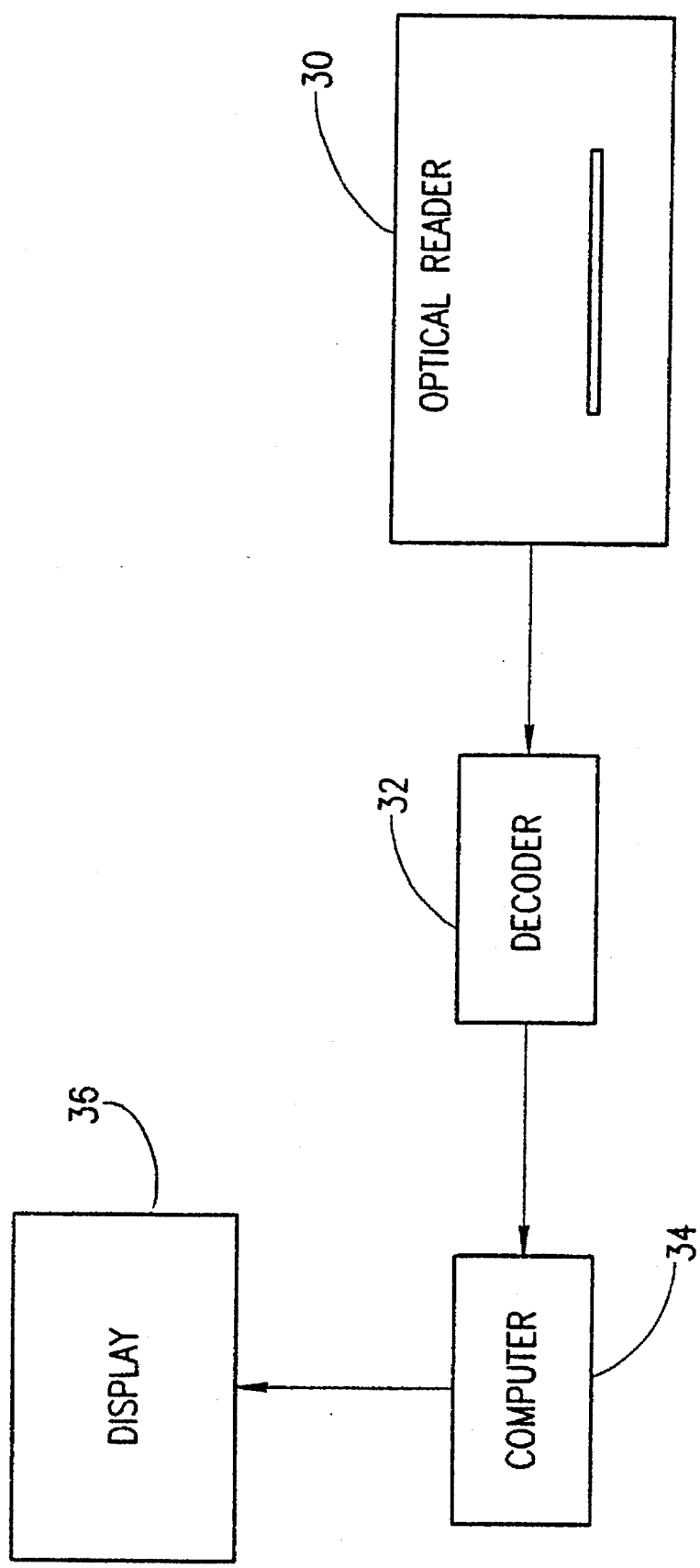
FIG. 3 is an illustration of a verification system constructed and operative in accordance with a preferred embodiment of the present invention.

Reference is now made to FIG. 3 which illustrates apparatus for reading monetary instruments of the type illustrated in any of FIGS. 1A–1C.

The apparatus comprises a reader 30, such as an optical reader, magnetic reader or any other suitable reader, which is suitable for reading the machine-only readable information printed on a monetary instrument. The output of reader 30 is preferably supplied to a decoder 32, which is preferably a decrypter when the information printed on the monetary instrument is encrypted. Any suitable conventional or unconventional decryption algorithm or key may be employed by the decoder 32.

The output of the decoder 32 is preferably supplied to a computer 34, which may be any suitable computer such as an IBM PC or Apple Mcintosh and which may employ a look-up-table or any other suitable software to provide, in response to an input received from decoder 32, an output which can be employed for verification purposes. In the illustrated embodiment, the output produced by computer 34 is supplied to a display 36 which displays it in the form of human readable information.

According to one preferred embodiment of the present invention, reader 30 is operative to read human recognizable information as well as machine-only readable information. The information and the machine-only readable information are processed successively or in parallel by decoder 32 and computer 34 and are displayed together in a human readable form on display 36.

The machine-only readable information may include a check number, the account number, the branch number, and an identification number of the authorized signatory.

In accordance with one preferred embodiment of the present invention, the machine-only readable information may include the authorized signature for a check.

It is a particular feature of the present invention that it provides a new and more efficient banking method whereby comparison of an actual signature on a check and a reference signature stored in machine-only readable information on the check, can take place at any location and not only at the drawer's bank branch as at present. In this way, physical transport of checks to the drawer's bank branch may be obviated and the signature on checks may be verified at the point of purchase without requiring communication with a remote central verification facility.

It will be appreciated by persons skilled in the art that the present invention is not limited by what has been particularly shown and described hereinabove. Rather the scope of the present invention is defined only by the claims which follow:

I claim:

1. A method for point of presentation signature verification for a monetary instrument comprising the steps of:

machine reading a machine-only readable representation of an authorized signature on a monetary instrument;

comparing an actual signature on the monetary instrument with said representation thereof provided by machine reading of the machine-only readable representation; and in response to similarity, providing an output indication of information verification.

2. A method according to claim 1 wherein said step of comparing is carried out by a human operator.

3. A method according to claim 1 and wherein said step of comparing is carried out by a machine.

4. A method for point of presentation information verification for a monetary instrument comprising the steps of:

machine reading a machine-only readable representation of information appearing on a monetary instrument;

comparing an information on the monetary instrument with said representation thereof provided by machine reading of the machine-only readable representation; and in response to similarity, providing an output indication of information verification.

5. A method according to claim 4 wherein said information is an identification number.

6. A method according to claim 4 wherein said information is a check number.

7. A method according to claim 4 wherein said information is an account number.

8. A method according to claim 4 wherein said information is a branch number.

9. A method according to claim 4 and wherein said information is a signature.

10. A method according to claim 4 and wherein said step of comparing is provided by a human operator.

11. A method according to claim 4 wherein said step of comparing is carried out by a machine.

12. A monetary instrument bearing a machine-only readable indication of an authorized signature wherein said machine-only readable indication is encrypted.

13. A system for verification of a monetary instrument bearing machine-only readable information thereon comprising:

a reader which reads said machine-only readable information and provides an output;

a computer which receives the output of said reader and provides an output of information represented by the machine-only readable information;

a display which displays, in human recognizable form, said information represented by the machine-only readable information;

an additional reader which reads human recognizable information on said monetary instrument and provides a second output; and a comparator which automatically compares the second output with the output of information represented by the machine-only readable information.

14. A system according to claim 13 and wherein said display is operative for displaying said output of said additional reader with said information represented by the machine-only readable information.

15. A system according to claim 13 wherein said information is an identification number.

16. A system according to claim 13 wherein said information is a check number.

17. A system according to claim 13 wherein said information is an account number.

18. A system according to claim 13 wherein said information is a branch number.

19. A system according to claim 13 wherein said information is a signature.

20. A system for verification of a monetary instrument bearing a machine-only readable signature thereon comprising:

a reader which reads said machine-only readable signature;

a computer which receives the output of said reader and provides an output of information represented by the machine-only readable signature;

a display which displays, in human recognizable form, said information represented by the machine-only readable signature, wherein said reader is also operative for reading an actual signature from said monetary instrument, said system also comprising:

a comparator which automatically compares an output of the actual signature with said output of information represented by the machine-only readable signature.

21. A system according to claim 20 and wherein said display is operative for displaying said output of said reader with said information represented by the machine-only readable signature.

* * * * *